(12) United States Patent
Harpster et al.

(10) Patent No.: US 11,267,025 B2
(45) Date of Patent: Mar. 8, 2022

(54) SYSTEMS FOR PUNCTURING MULTIPLE AEROSOL CANS

(71) Applicant: New Pig Corporation, Tipton, PA (US)

(72) Inventors: Gregory R. Harpster, Pine Grove Mills, PA (US); Daniel J. Gongloff, Ashville, PA (US); Dane R. Jackson, Port Matilda, PA (US)

(73) Assignee: New Pig Corporation, Tipton, PA (US)

(*) Notice: Subject to any disclaimer, the term of this patent is extended or adjusted under 35 U.S.C. 154(b) by 0 days.

(21) Appl. No.: 16/944,384

(22) Filed: Jul. 31, 2020

(65) Prior Publication Data

US 2021/0031249 A1 Feb. 4, 2021

Related U.S. Application Data

(60) Provisional application No. 62/881,572, filed on Aug. 1, 2019.

(51) Int. Cl.
*B09B 3/00* (2006.01)

(52) U.S. Cl.
CPC ........ *B09B 3/0058* (2013.01); *B09B 2220/02* (2013.01)

(58) Field of Classification Search
CPC .......................... B09B 3/0058; B09B 2220/02
USPC ....................................................... 141/330
See application file for complete search history.

(56) References Cited

U.S. PATENT DOCUMENTS

| | | | | |
|---|---|---|---|---|
| 3,835,768 | A * | 9/1974 | Kidson | B30B 9/321 100/94 |
| 4,459,906 | A * | 7/1984 | Cound | B09B 3/0058 100/116 |
| 5,067,529 | A | 11/1991 | Gonzalez-Miller et al. | |
| 5,114,043 | A * | 5/1992 | Collins, Jr. | B65B 69/0041 141/65 |
| 5,163,585 | A | 11/1992 | Campbell | |
| 5,174,344 | A | 12/1992 | Gonzalez-Miller et al. | |
| 5,265,762 | A | 11/1993 | Campbell et al. | |
| 5,271,437 | A * | 12/1993 | O'Brien | B09B 3/0058 141/51 |
| 5,285,827 | A | 2/1994 | Gonzalez-Miller et al. | |
| 5,309,956 | A * | 5/1994 | Hajma | B09B 3/0058 100/104 |

(Continued)

FOREIGN PATENT DOCUMENTS

WO  2017030540  2/2017

OTHER PUBLICATIONS

The International Search Report and the Written Opinion of the International Searching Authority for International Application No. PCT/US2020/044434, 14 pages.

(Continued)

*Primary Examiner* — Timothy L Maust
(74) *Attorney, Agent, or Firm* — Alan G. Towner; Leech Tishman Fuscaldo & Lampl

(57) ABSTRACT

Multiple-can aerosol puncturing systems that are capable of puncturing multiple aerosol cans in a single operation are disclosed. A can holder with multiple chambers and a movable lid are used to contain the aerosol cans. A vertically movable actuation plate with multiple hollow puncturing pins is raised toward the can holder to puncture the lids of the aerosol cans. The heights of the puncturing pins may be staggered in order to puncture the lids sequentially during the same draining operation.

30 Claims, 8 Drawing Sheets

(56) References Cited

U.S. PATENT DOCUMENTS

| | | |
|---|---|---|
| 5,322,093 A | 6/1994 | O'Neil |
| 5,341,853 A | 8/1994 | Nugues et al. |
| 5,365,982 A | 11/1994 | O'Neill |
| 5,385,177 A | 1/1995 | O'Neil |
| 5,421,380 A | 6/1995 | Campbell |
| 5,441,088 A * | 8/1995 | O'Neill ................. B09B 3/0058 100/902 |
| 5,469,898 A | 11/1995 | Campbell |
| 5,615,715 A * | 4/1997 | Yore .................... B09B 3/0058 141/1 |
| 5,732,752 A * | 3/1998 | Glessner ................... B63C 9/23 141/329 |
| 5,740,615 A | 4/1998 | Treske |
| 5,934,511 A * | 8/1999 | Ausmus ................ B09B 3/0058 222/87 |
| 5,992,475 A * | 11/1999 | Campbell ........... B65B 69/0041 141/329 |
| 6,422,273 B1 | 7/2002 | Campbell |
| 6,481,470 B1 | 11/2002 | Rubenic |
| 9,808,842 B2 | 11/2017 | Campbell |
| 9,827,528 B2 | 11/2017 | Campbell |
| 9,845,232 B2 * | 12/2017 | Campbell ................. B67B 7/24 |
| 9,993,764 B2 | 6/2018 | Campbell |
| 2018/0127253 A1 | 5/2018 | Campbell et al. |

OTHER PUBLICATIONS

AeroVent 3X Product Manual, Newstripe Inc., 4721.0117, 11 pages.

* cited by examiner

SYSTEMS FOR PUNCTURING MULTIPLE AEROSOL CANS

CROSS-REFERENCE TO RELATED APPLICATION

This application claims the benefit of U.S. Provisional Patent Application No. 62/881,572 filed Aug. 1, 2019, which is incorporated herein by reference.

FIELD OF THE INVENTION

The present invention relates to systems for puncturing and draining multiple aerosol cans in a single operation.

BACKGROUND INFORMATION

Conventional aerosol can puncturing units can puncture and drain a single aerosol can so it is acceptable for recycling. The single-can units may be installed on the lid of a disposal container such as a fifty-five gallon drum to contain the drained content of each aerosol can.

SUMMARY OF THE INVENTION

The present invention provides multiple-can aerosol puncturing systems that are capable of puncturing multiple aerosol cans in a single operation. A can holder with multiple chambers and a movable lid are used to contain the aerosol cans. A vertically movable actuation plate with multiple hollow puncturing pins is raised toward the can holder to puncture the lids of the aerosol cans. The heights of the puncturing pins may be staggered in order to puncture the lids sequentially during the same puncturing and draining operation.

An aspect of the present invention is to provide an aerosol can puncturing system comprising a base comprising a bottom drain structured and arranged for attachment to a disposal drum, a can holder supported by the base structured and arranged to receive multiple aerosol cans to be punctured, a lid structured and arranged to removably cover the can holder, and a puncture actuation assembly comprising a base plate having multiple puncturing pins mounted thereon, wherein the can holder and the base plate are vertically movable relative to each other to insert the puncturing pins into the can holder to thereby puncture the multiple aerosol cans.

Another aspect of the present invention is to provide a method of puncturing multiple aerosol cans in a single puncturing operation. The method comprises placing the multiple aerosol cans into a can holder comprising multiple chambers, each chamber receiving one of the aerosol cans, and puncturing all of the aerosol cans by inserting multiple puncturing pins into the multiple aerosol cans, wherein the multiple puncturing pins are mounted on a base plate, the can holder and the base plate are vertically movable relative to each other, each of the multiple puncturing pins is aligned with a respective one of the multiple aerosol cans, and the relative vertical movement of the can holder and the base plate causes the multiple puncturing pins to puncture the multiple aerosol cans during the relative vertical movement.

A further aspect of the present invention is to provide an aerosol can puncturing system comprising a base comprising a bottom drain structured and arranged for attachment to a disposal drum, a can holder supported by the base structured and arranged to receive at least one aerosol can to be punctured, a lid structured and arranged to removably cover the can holder, and a puncture actuation assembly comprising a base plate having at least one puncturing pin mounted thereon, wherein the base plate is movable vertically upward toward the can holder to insert the at least one puncturing pin into the can holder to thereby puncture the at least one aerosol can.

These and other aspects of the present invention will be more apparent from the following description.

DETAILED DESCRIPTION

Figure 1:
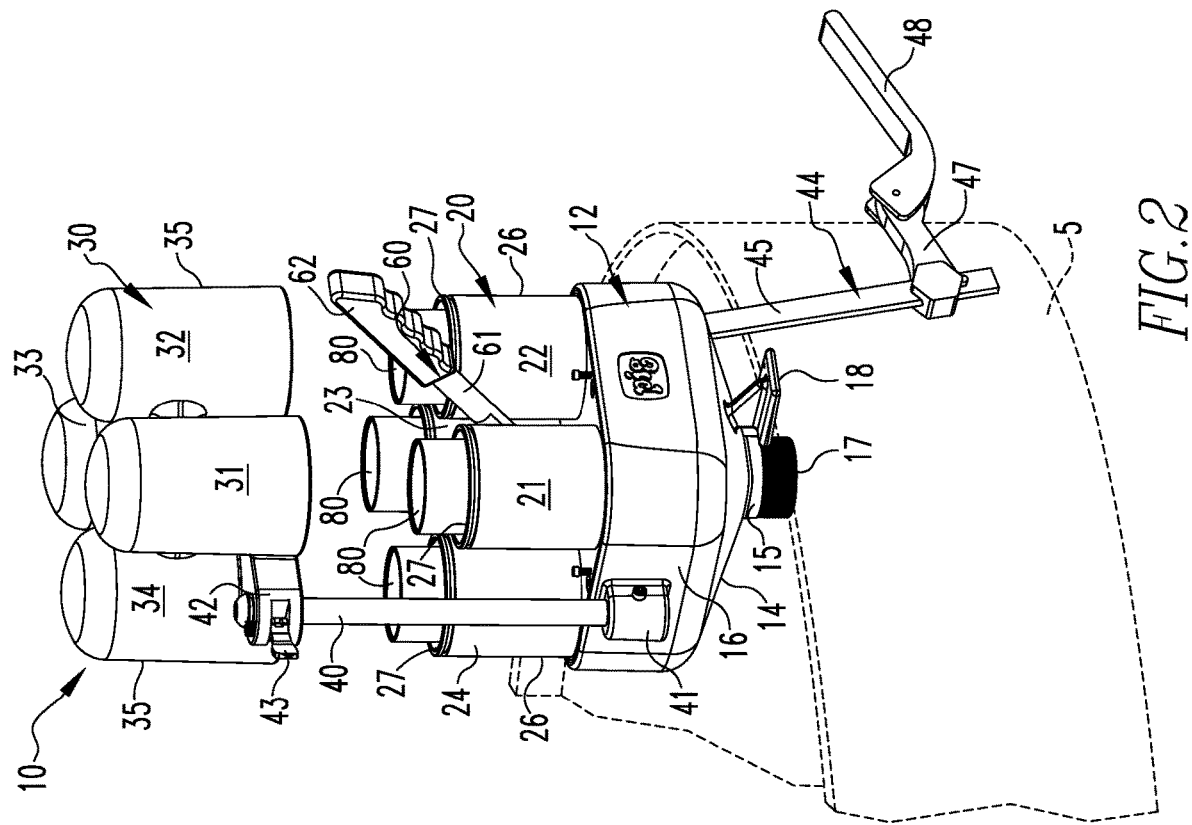
FIG. 1 is an isometric view of an aerosol can puncturing system of the present invention mounted on a disposal drum.
Figure 2:
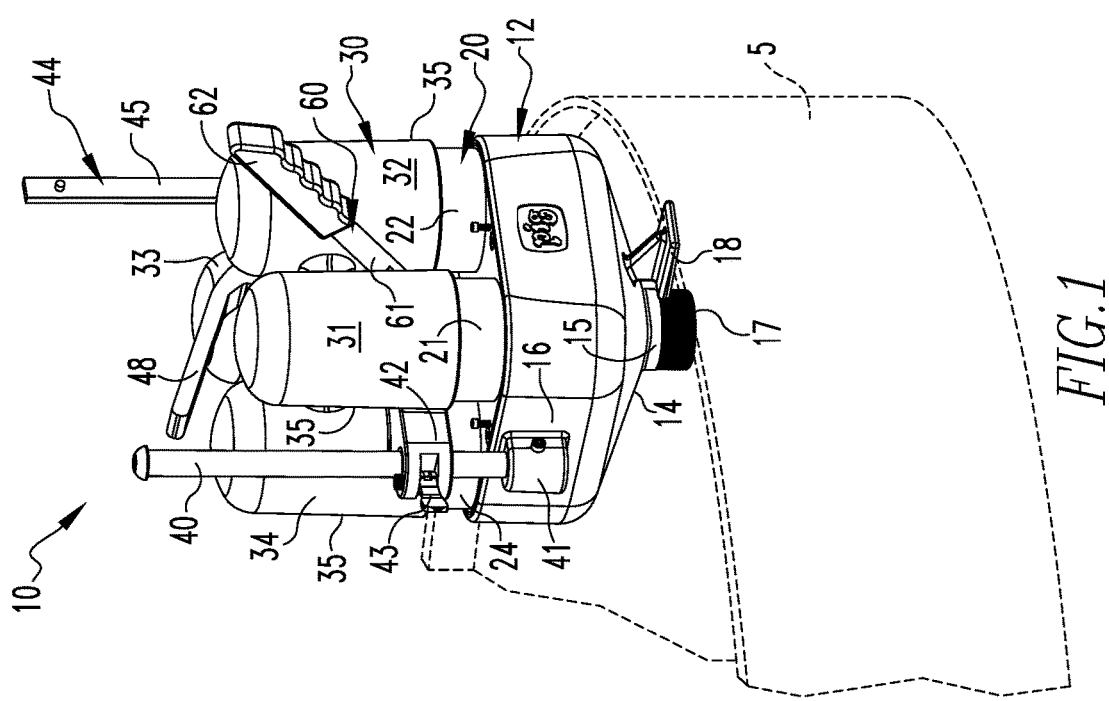
FIG. 2 is an isometric view of the aerosol can puncturing system of FIG. 1 with a lid of the system in a raised position.

FIGS. 1-10 illustrate an aerosol can puncturing system 10 capable of puncturing and draining multiple aerosol cans in a single operation in accordance with an embodiment of the present invention. As schematically shown in FIGS. 1 and 2, the aerosol can puncturing system 10 may be mounted on a disposal drum 5 (shown in phantom) such as a conventional fifty five-gallon drum. The aerosol can puncturing system 10 includes a base 12 having a bottom wall 14 with a central bottom drain 15 and a sidewall 16. A threaded collar 17 is provided at the bottom of the drain 15, and may be sized to connect with a standard threaded opening (not shown) of the disposal drum 5. A support foot 18 is attached to the bottom wall 14 of the base 12, and contacts the upper rim of the disposal drum 5 in order to support the aerosol can puncturing system 10 during use.

As shown in FIGS. 1-10, the aerosol can puncturing system 10 includes a can holder 20 having a first chamber 21, second chamber 22, third chamber 23 and fourth chamber 24. Each of the first, second, third and fourth chambers 21-24 includes a bottom opening 25, as most clearly shown in the top view of FIG. 4 and the sectional views of FIGS. 8 and 9. Each of the first, second, third and fourth chambers 21-24 has a generally cylindrical sidewall 26 and upper opening 27. Although four chambers are shown in the figures, any other suitable number of chambers may be used, such as two, three, five, six, and the like. In this manner, multiple aerosol cans 80 may be loaded into the aerosol can puncturing system 10, and can be punctured and drained in a single operation.

Figure 8:
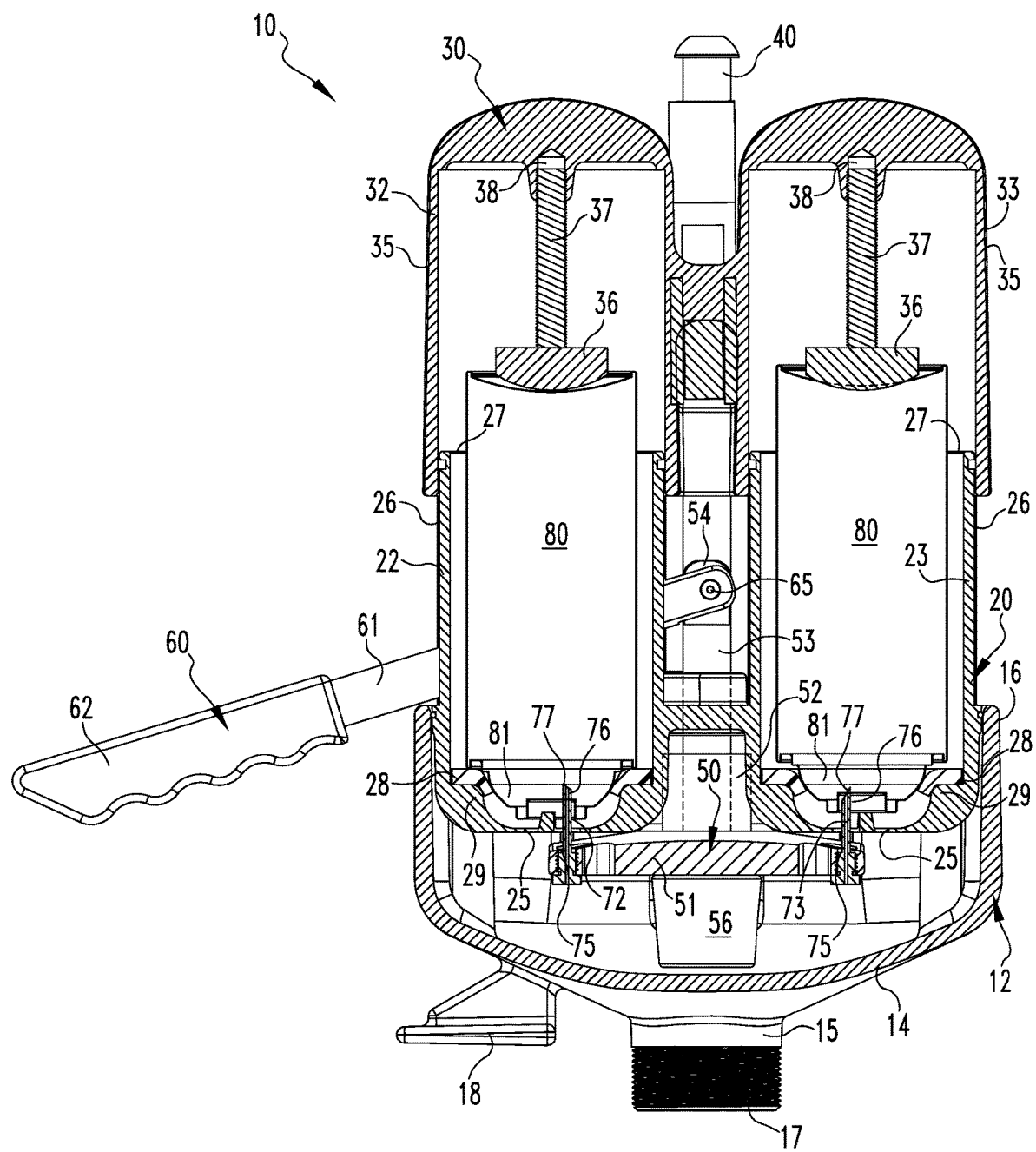
FIG. 8 is a side sectional view taken through line 8-8 of FIG. 6 showing the system in a can-puncturing position.
Figure 9:
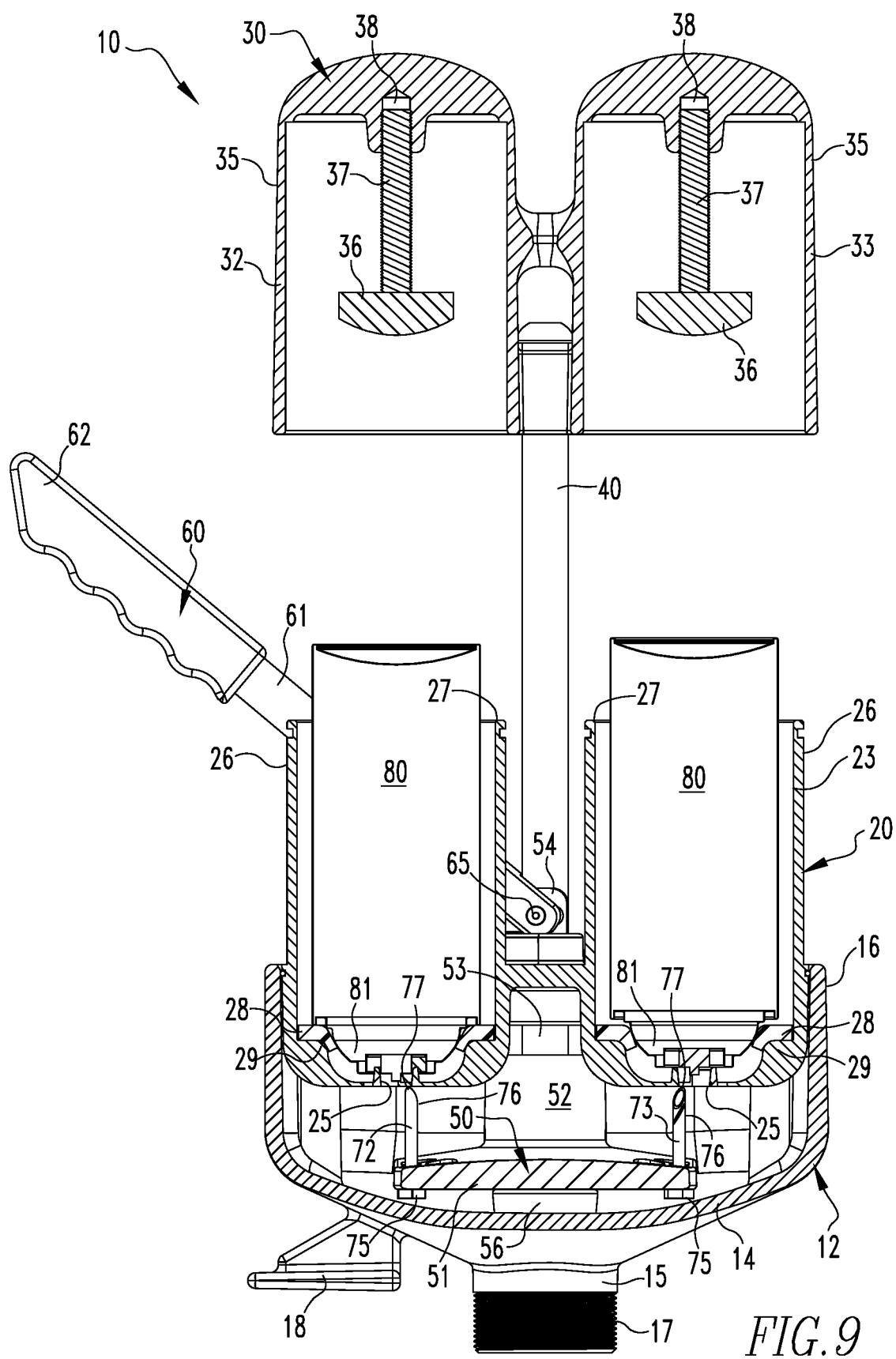
FIG. 9 is a side sectional view similar to FIG. 8 with lid and actuation handle in raised positions.

As shown most clearly in FIGS. 8 and 9, an annular gasket seal 28 is provided at the bottom of each of the first, second, third and fourth chambers 21-24, and is supported by an annular shoulder 29 at the bottom of each chamber.

As shown in FIGS. 1-10, a lid 30 is secured to the base 12 and is removably engageable with the can holder 20. The lid 30 includes a first dome 31, second dome 32, third dome 33 and fourth dome 34. Each of the first, second, third and fourth domes 31-34 has a generally cylindrical sidewall 35 terminating at a lower circular opening.

The lid 30 is mounted on the base 12 by a lid support rod 40 attached at a lower end to a base connecting fitting 41, and slidingly engageable with a lid connecting fitting 42 secured to the lid 30. A thumb lock 43 on the lid connecting fitting 42 can be pivoted to engage the support rod 40 in order to releasably hold the lid 30 in various vertical and rotational positions.

Figure 3:
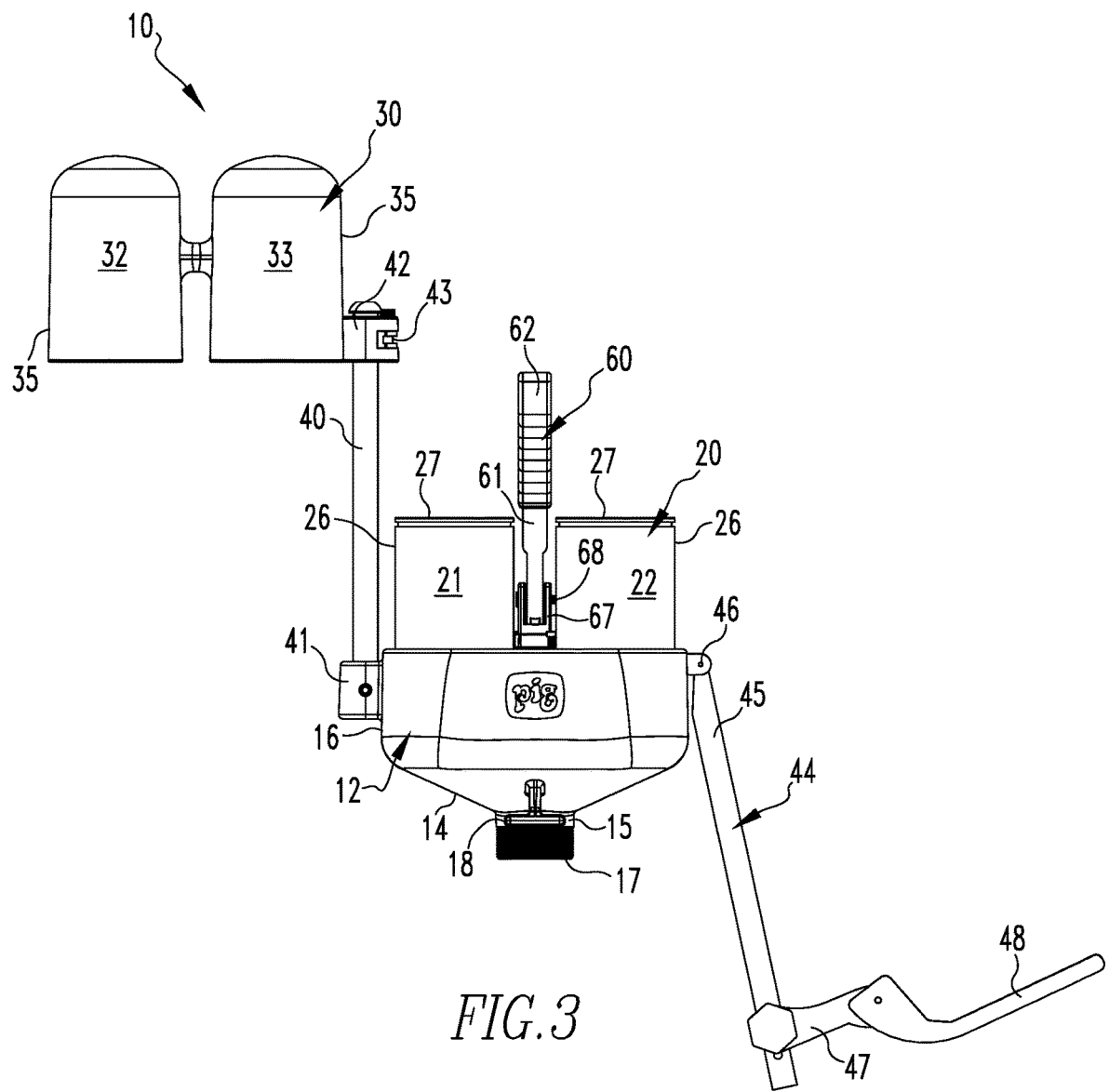
FIG. 3 is a side view of the aerosol can puncturing system of FIG. 1 with the lid in a raised and rotated position.
Figure 4:
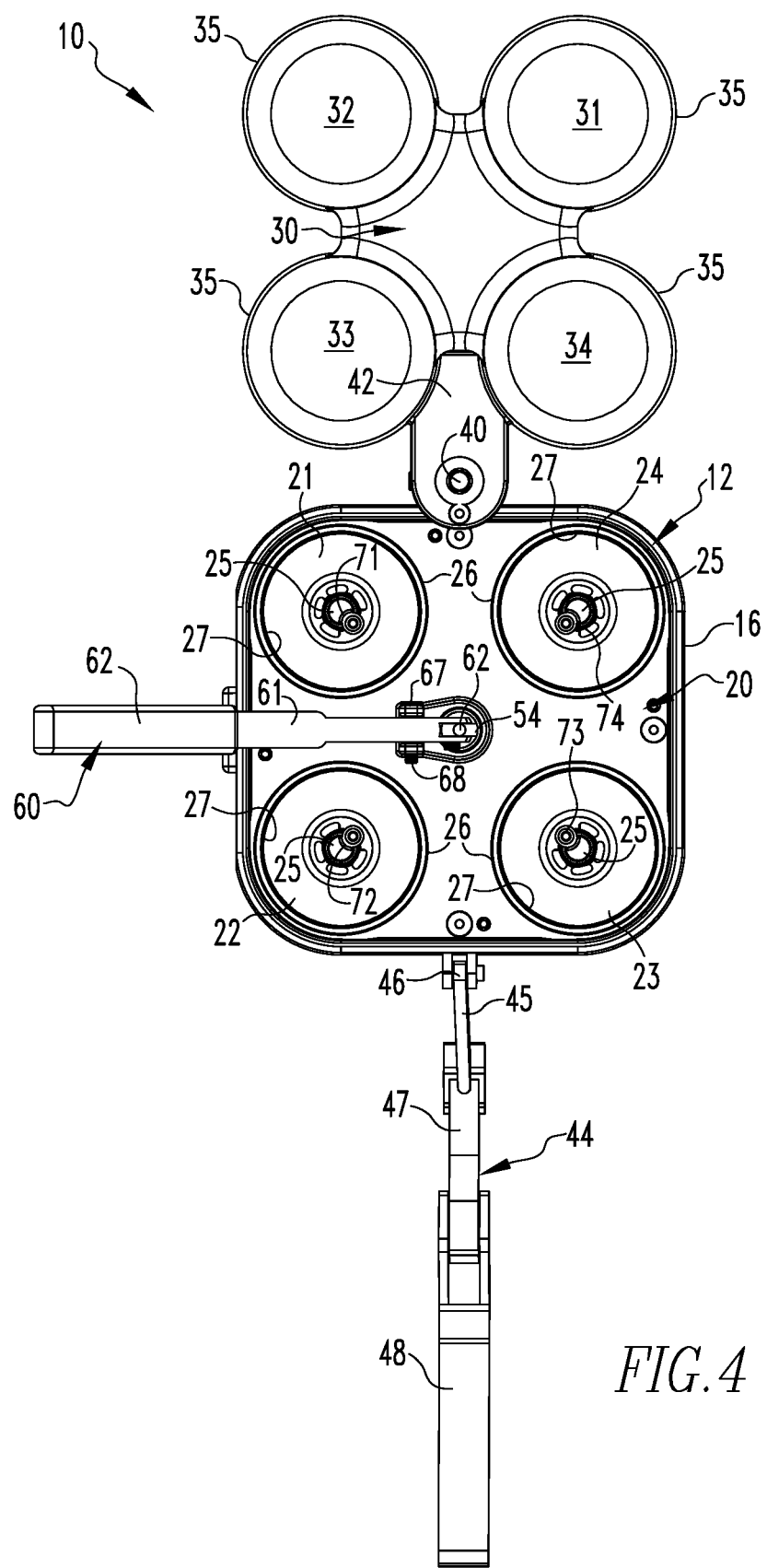
FIG. 4 is a top view of the aerosol can puncturing system of FIG. 3.
Figure 5:
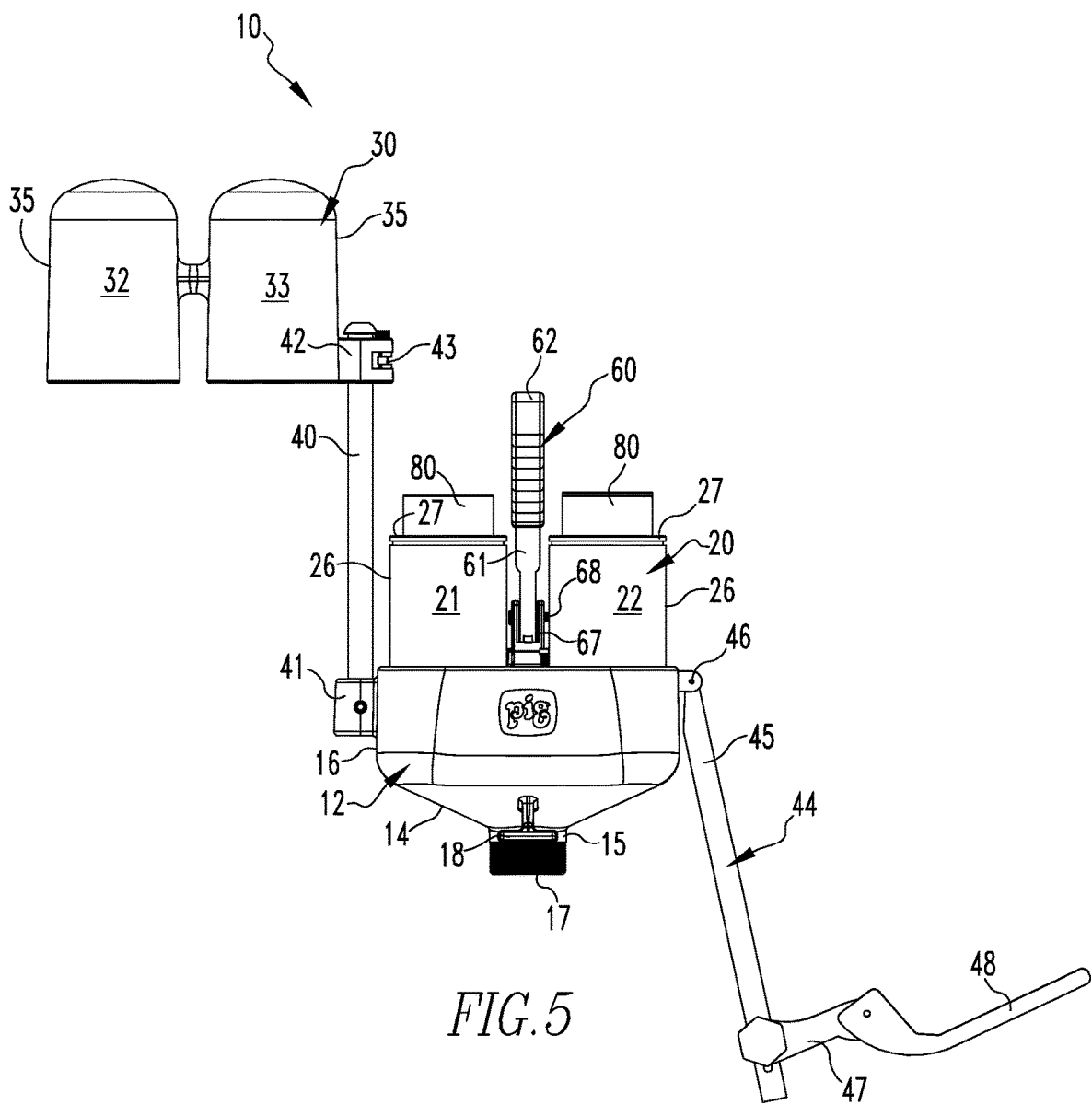
FIG. 5 is a side view of the aerosol can puncturing system similar to FIG. 3, with multiple aerosol cans loaded therein for puncturing and draining.
Figure 6:
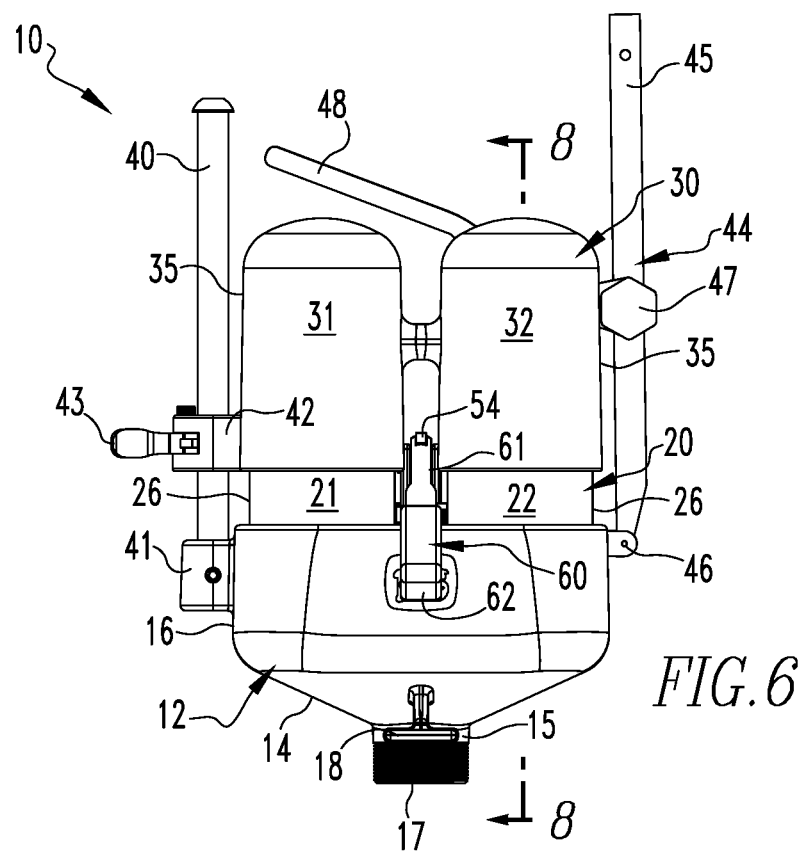
FIG. 6 is a side view of the aerosol can puncturing system with the lid closed and an actuation handle in a downward can-puncturing position.
Figure 7:
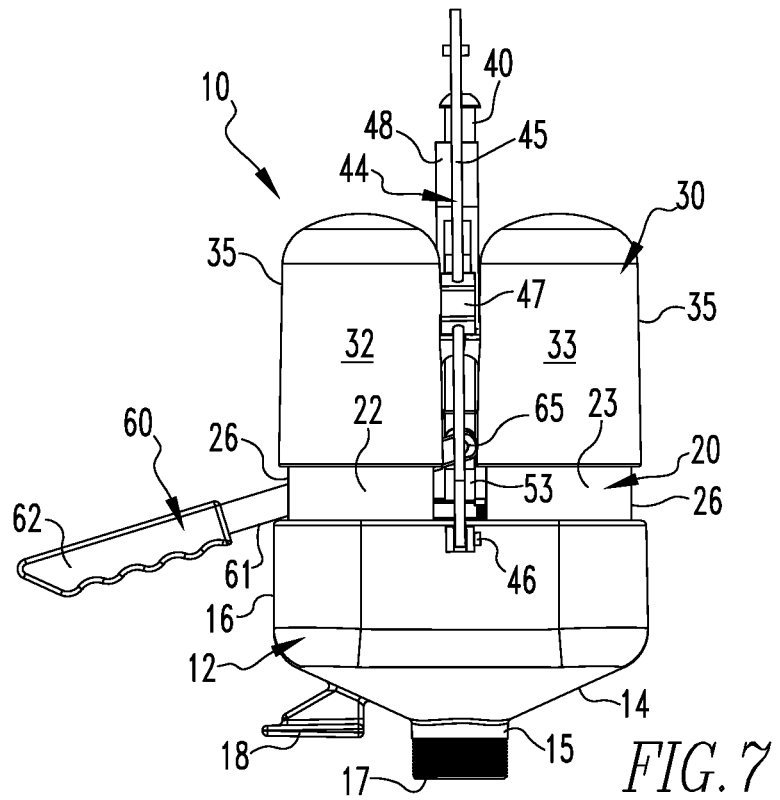
FIG. 7 is a front view of the aerosol can puncturing system of FIG. 6.

In FIGS. 1 and 6-8, the lid 30 is in a closed position in which each of the first, second, third and fourth domes 31-34 covers each of the first, second, third and fourth chambers 21-24, respectively. In FIGS. 2 and 9, the lid 30 is raised to a position vertically above the can holder 20. In FIGS. 3-5, the lid 30 is vertically raised and rotated 180 degrees around a vertical axis of the lid support rod 40 in order to provide access for loading and unloading the aerosol cans 80 into their respective first, second, third and fourth chambers 21-24.

Figure 10:
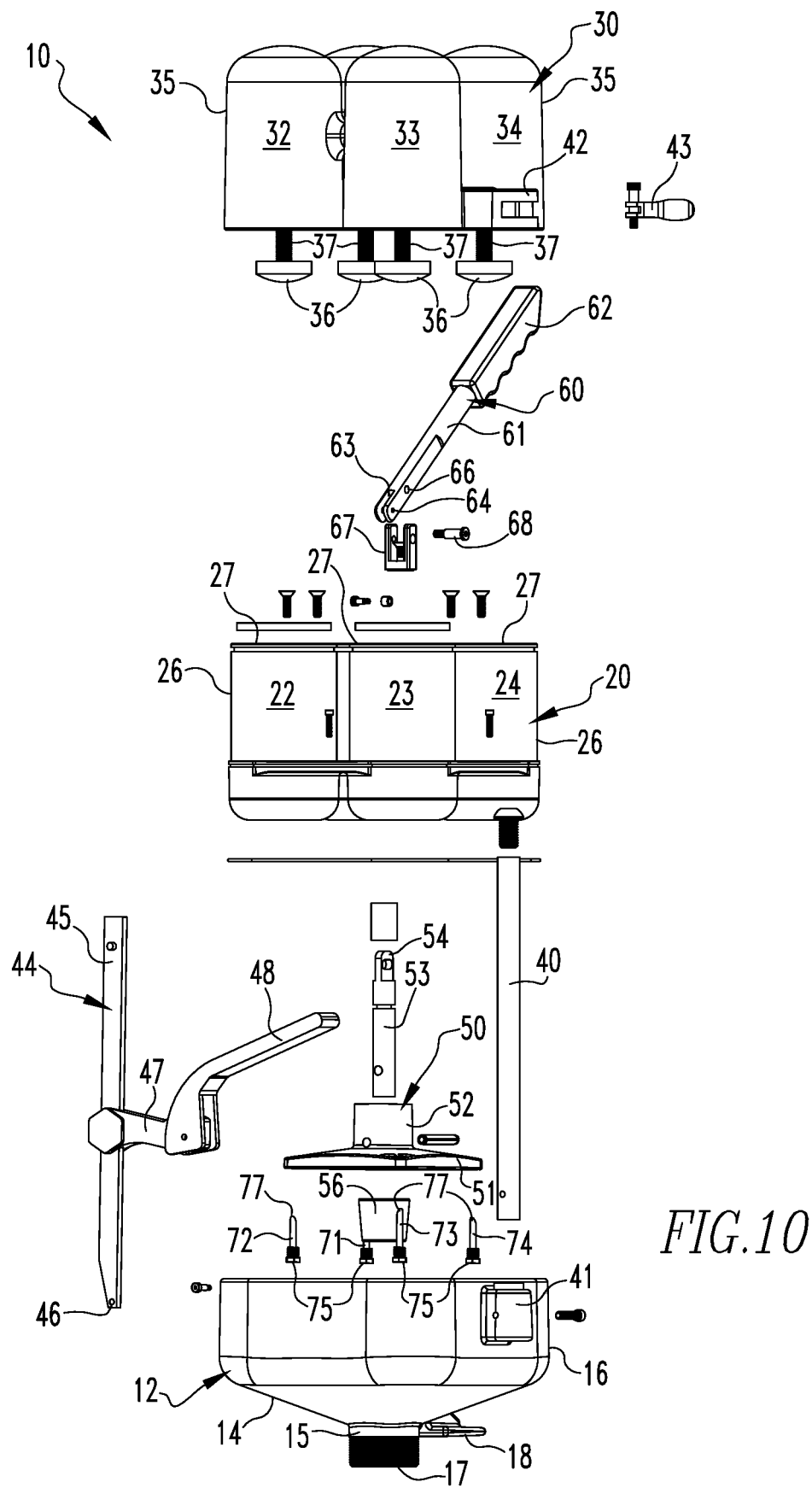
FIG. 10 is an exploded side view showing components of the aerosol can puncturing system.

As shown in FIGS. 8-10, vertically adjustable hold-down shoes 36 are attached to the bottoms of threaded hold-down rods 37. Each of the first, second, third and fourth domes 31-34 has a central threaded hole 38 threadingly engaged with each hold-down rod 37. The hold-down shoes 36 are height-adjustable to accommodate varying heights of aerosol cans 80. As further shown in FIGS. 8 and 9, each aerosol can 80 includes a lid 81 that is inserted downward into the can holder 20 and may be punctured during a draining operation, as more fully described below.

A lid locking assembly 44 is provided for locking the lid 30 in its closed position during a draining operation. The lid locking assembly 44 includes a lock bar 45 pivotally mounted on the base 12 by a pivot mounting 46. A slidable bracket 47 slidably engages the lock bar 45. A rotatable handle 48 is pivotally mounted on the slidable bracket 47. In FIGS. 2-5, the lid locking assembly 44 is in an open position, while in FIGS. 1, 6 and 7 the lid locking assembly 44 is in a locked position. In the open position shown in FIG. 5, the sliding bracket 47 moves freely along the lock bar 45. When the lid 30 is moved into the closed position shown in FIG. 6 the lid locking assembly 44 is rotated to position the slidable bracket 47 and the rotatable handle 48 above the lid 30. The slidable bracket 47 and rotatable handle 48 are lowered until the rotatable handle 48 makes contact with the flat bracing of the lid 30. The rotatable handle 48 is then rotated to supply sufficient pressure to the lid 30 to prevent the lid from moving vertically.

A vertically movable puncture actuation assembly 50 includes a base plate 51, central flange 52 and reciprocating actuation rod 53. The reciprocating actuation rod 53 has an upper connection tab 54 having a hole for pivotal attachment to an actuation handle assembly 60. As shown in FIGS. 8-10, a first puncturing pin 71, second puncturing pin 72, third puncturing pin 73 and fourth puncturing pin 74 are secured to the base plate 51 of the vertically movable puncture actuation assembly 50. A plug or stopper 56 is attached to the bottom of the base plate 51. When the base plate 51 is in its lowered position as shown in FIG. 9, the stopper 56 fits inside and seals the drain 15 of the base. When the base plate is in its raised position as shown in FIG. 8, the stopper is removed from the drain 15.

The aerosol can puncturing system 10 includes an actuation handle assembly 60 having an actuation bar 61 and a handle 62 at one end of the actuation bar 61. An end slot 63 and end hole 64 are provided at the other end of the actuation bar 61. The end slot 63 receives the upper connection tab 54 of the reciprocating actuation rod 53, and a connecting pin 65 extending through the end hole 64 of the end slot 63 and the hole of the upper connection tab 54 provides a pivoting connection between the actuation rod 53 and actuation bar 61. The actuation bar 61 is pivotally attached to the can holder 20 by means of a pivot hole 66 through the actuation bar 61 that is located between the end hole 64 and handle 62. A generally U-shaped support bracket 67 attached to an upper surface of the can holder 20 receives a portion of the actuation bar 61 therein, and a pivot pin 68 inserted through the bracket 67 and pivot hole 66 provides a pivot mounting for the actuation handle assembly 60 on the can holder 20. Although the actuation handle assembly 60 shown in the figures includes a manual handle 62, it is to be understood that the actuation handle assembly may be automatically actuated, e.g., by use of pneumatic, hydraulic, electrical or other automated systems known to those skilled in the art.

Each of the first, second, third and fourth puncturing pins 71-74 has a base fitting 75 for attachment to the base plate 51 of the vertically movable puncture actuation assembly 50. The first, second, third and fourth puncturing pins 71-74 have hollow cylindrical bodies with angled puncturing tips 77 at the top. As more fully described below, the heights of the puncturing tips 77 may be staggered in order to sequentially puncture the lids 81 of the aerosol cans 80 during a draining operation.

The actuation bar 61 of the handle assembly 60 rotates around the pivot pin 68 of the support bracket 67 when the handle 62 is lowered. The top of the actuation rod 53 is pivotally attached by the connecting pin 65 to the distal end of the actuator bar 61. The base plate 51 attached to the bottom of the actuation rod 53 supports the four hollow puncturing pins 71, 72, 73 and 74, which pierce the top 81 of each aerosol can 80 when the actuation bar 61 and handle 62 are moved to their lowered positions shown in FIGS. 6-8. Upon puncturing each aerosol can 80, any remaining liquid in each can flows into the funneled discharge port or drain 15.

In accordance with embodiments of the present invention, some or all of the hollow puncturing pins 71, 72, 73 and 74 are of different lengths such that puncturing of the aerosol cans 80 is staggered. In this manner, sequential puncturing of the aerosol cans 80 can be achieved in a single operation of the actuation handle assembly 60. The hollow puncturing pins 71-74 may vary in lengths with respect to each other from zero to 1 inch, for example, from 0.05 to 0.5 inch, or from 0.1 to 0.25 inch. Thus, their angled puncturing tips 77 are provided at different heights.

By staggering the heights of one, two, three or four of the puncturing pins 71-74, the actuation force necessary to puncture all of the cans 80 in a single operation may typically be decreased by 10%, or 20%, or 30%. For example, when the puncturing pins 71 and 73 are shorter than the puncturing pins 72 and 74, it has been found that the activation force applied to the handle 62 of the activation arm 60 decreases from 37 pounds to 23 pounds, which represents a 38% reduction in the activation force necessary to puncture the cans 80.

The aerosol can puncturing system 10 shown in the figures can handle up to four cans 80 at a time. The cans 80 may be placed with their lids 81 downward into the multiple chambers 21, 22, 23 and 24 that can accommodate various sizes of aerosol cans by adjusting the can hold-down shoes 36. The thumb lock 43 and lid locking assembly 44 are engaged to prevent released propellant from forcing the lid 30 open. The puncture activation handle 62 is pressed downward, which moves the base plate 51 and puncturing pins 71-74 upward to puncture the aerosol cans 80. Any remaining fluid and propellant gas in the aerosol cans 80 exits through the hollow pins 71-74 into the base 12, where it drains into the disposal drum 5. During such puncturing and draining operations, the can holder 20, lid 30 and cans 80 remain stationary, and the vertical upward movement of the puncture activation assembly 50 and puncturing pins 71-74 punctures the lid(s) 81 or one or more cans 80 loaded in the puncturing system 10. As described above, the puncturing pins 71-74 may be of least two different lengths so that they all do not puncture the aerosol cans 80 at the same time, which allows for a lower force requirement on the actuation handle 62 to puncture multiple cans during one lever activation. All of the hollow puncturing pins 71-74 may be of different lengths, or two pins may be of one length and the other two pins may be of another length, e.g., diagonally opposed puncturing pins 71 and 73 may be the same length as each other. Once the cans are punctured and drained, the lid 30 is opened and the cans are manually removed from the can holder 20.

The puncturing pins 71-74, as well as any other surfaces that may be exposed to the drained liquids from the aerosol cans 80, may be coated with a low surface energy durable material to reduce fouling of the surfaces, such as polytetrafluoroethene (PTFE or Teflon) and the like.

A disposable drain pan (not shown) may be placed on the bottom wall 14 in the liquid funneling area of the base 12 below the activation plate 51, and may extend downward at least partially into the neck of the drain opening 15. When the contoured disposable drain pan becomes fouled or coated with the drained liquids from the aerosol cans, it can be removed and discarded, and a new drain pan can be installed. The drain pan may be made from a low surface energy durable material such as polyolefin and the like.

Advantages provided by the multiple-can aerosol puncturing systems of the present invention include the ability to puncture multiple cans in a single operation (faster cycle time for the operator), sequential puncturing of the cans (reduces the activation puncturing force), promoting full drainage of the can due to vertical design, and easily adaptable to pneumatic, hydraulic or electrical activation systems.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. An aerosol can puncturing system comprising:
   a base comprising a bottom drain structured and arranged for attachment to a disposal drum;
   a can holder supported by the base structured and arranged to receive multiple aerosol cans to be punctured;
   a lid structured and arranged to removably cover the can holder;
   a puncture actuation assembly comprising a base plate having multiple puncturing pins mounted thereon, wherein the can holder is stationary and the base plate and puncturing pins are vertically movable relative to the can holder to insert the puncturing pins into the can holder to thereby puncture the multiple aerosol cans; and
   an actuation handle assembly comprising an actuation bar mounted on the can holder structured and arranged to pull the base plate vertically upward.

2. The aerosol can puncturing system of claim 1, further comprising a reciprocating actuation rod comprising a lower end connected to the base plate and an upper end pivotally connected to a distal end of the actuation bar.

3. The aerosol can puncturing system of claim 1, wherein the can holder comprises four chambers structured and arranged to hold up to four of the aerosol cans.

4. The aerosol can puncturing system of claim 3, wherein the lid comprises four domes structured and arranged to removably cover the four chambers of the can holder.

5. The aerosol can puncturing system of claim 3, comprising four of the puncturing pins, wherein each of the puncturing pins is structured and arranged to be inserted into one of the four chambers of the can holder.

6. The aerosol can puncturing system of claim 5, wherein at least one of the four puncturing pins has a different height from the other puncturing pins as measured from an upper surface of the base plate.

7. The aerosol can puncturing system of claim 1, wherein each of the multiple puncturing pins are hollow and are secured to the base plate by a fitting structured and arranged to allow fluid drained from the aerosol can to pass through the base plate for discharge through the bottom drain of the base.

8. The aerosol can puncturing system of claim 7, wherein each of the multiple puncturing pins comprises an upper puncturing tip, and at least one of the puncturing tips is located at a different height from the other puncturing tips as measured from an upper surface of the base plate.

9. The aerosol can puncturing system of claim 8, wherein all of the puncturing tips are located at different heights.

10. The aerosol can puncturing system of claim 8, wherein two of the puncturing tips are located at a first height, and two other of the puncturing tips are located at a second height different from the first height.

11. The aerosol can puncturing system of claim 10, wherein the two puncturing pins having the two puncturing tips located at the first height are diametrically opposed from each other at an 180° spacing interval measured circumferentially around a vertical central axis of the base plate.

12. The aerosol can puncturing system of claim 8, wherein the different height of the at least one puncturing tip is from 0.05 to 0.5 inch different from the height of at least one other of the puncturing tips.

13. The aerosol can puncturing system of claim 1, wherein the lid comprises multiple hold-down shoes structured and arranged to contact base ends of the aerosol cans when the aerosol cans are received in the can holder and the lid covers the can holder.

14. The aerosol can puncturing system of claim 13, wherein each of the hold-down shoes is adjustable in a vertical direction to accommodate aerosol cans of differing heights.

15. The aerosol can puncturing system of claim 14, wherein each of the hold-down shoes is attached to a bottom end of a threaded hold-down rod, and an upper end of each threaded hold-down rod is threadingly engaged in a respective threaded hole of the lid.

16. The aerosol can puncturing system of claim 1, wherein the lid is slidably mounted on a vertical lid support rod, and a lower end of the vertical lid support rod is secured to a base connecting fitting connected to the base.

17. The aerosol can puncturing system of claim 16, wherein the lid comprises a lid connecting fitting slidably and rotatably receiving the vertical lid support rod structured and arranged to allow the lid to move vertically with respect to the can holder, and to allow the lid to rotate around a vertical axis to an open loading position that is not vertically above the can holder.

18. The aerosol can puncturing system of claim 17, comprising a thumb lock mounted on the lid connecting fitting structured and arranged to releasably engage the vertical lid support rod to thereby maintain the lid in selected positions in relation to the can holder.

19. The aerosol can puncturing system of claim 1, further comprising a lid locking assembly comprising a lock bar having a lower end pivotally mounted to the base, a slidable bracket slidably mounted on the lock bar, and a rotatable handle rotatably mounted on the slidable bracket, wherein the rotatable handle is structured and arranged to releasably contact the upper lid to prevent the lid from moving vertically upward.

20. The aerosol can puncturing system of claim 1, further comprising a stopper attached to a bottom of the base plate of the puncture actuation assembly structured and arranged to seal the bottom drain of the base when the base plate is in a lowered position.

21. A method of puncturing multiple aerosol cans in a single puncturing operation, the method comprising:

placing the multiple aerosol cans into a can holder comprising multiple chambers, each chamber receiving one of the aerosol cans;
puncturing all of the aerosol cans by inserting multiple puncturing pins into the multiple aerosol cans, wherein the multiple puncturing pins are mounted on a base plate, the can holder is stationary and the base plate and puncturing pins are vertically movable relative to the can holder, each of the multiple puncturing pins is aligned with a respective one of the multiple aerosol cans, and the vertical movement of the base plate and puncturing pins causes the multiple puncturing pins to puncture the multiple aerosol cans during the relative vertical movement; and
moving an actuation handle assembly comprising an actuation bar mounted on the can holder to thereby pull the base plate vertically upward.

22. The method of claim 21, wherein at least one of the multiple puncturing pins has a different height from the other puncturing pins as measured from an upper surface of the base plate.

23. An aerosol can puncturing system comprising:
a base comprising a bottom drain structured and arranged for attachment to a disposal drum;
a can holder supported by the base structured and arranged to receive at least one aerosol can to be punctured;
a lid structured and arranged to removably cover the can holder; and
a puncture actuation assembly comprising a base plate having at least one puncturing pin mounted thereon,
wherein the base plate and the can holder are vertically movable relative to each other to insert the at least one puncturing pin into the can holder to thereby puncture the at least one aerosol can, the lid is slidably mounted on a vertical lid support rod having a lower end connected to the base, and the lid comprises a lid connecting fitting slidably and rotatably receiving the vertical lid support rod structured and arranged to allow the lid to move vertically with respect to the can holder, and to allow the lid to rotate around a vertical axis to an open loading position that is not vertically above the can holder.

24. The aerosol can puncturing system of claim 23, comprising at least two of the puncturing pins mounted on the base plate.

25. An aerosol can puncturing system comprising:
a base comprising a bottom drain structured and arranged for attachment to a disposal drum;
a can holder supported by the base structured and arranged to receive multiple aerosol cans to be punctured;
a lid structured and arranged to removably cover the can holder; and
a puncture actuation assembly comprising a base plate having multiple puncturing pins mounted thereon,
wherein the can holder and the base plate are vertically movable relative to each other to insert the puncturing pins into the can holder to thereby puncture the multiple aerosol cans, wherein at least one of the puncturing pins has a different height from the other puncturing pins as measured from an upper surface of the base plate.

26. The aerosol can puncturing system of claim 25, wherein each of the multiple puncturing pins comprises an upper puncturing tip, and at least one of the puncturing tips is located at a different height from the other puncturing tips as measured from an upper surface of the base plate.

27. The aerosol can puncturing system of claim 26, wherein all of the puncturing tips are located at different heights.

28. The aerosol can puncturing system of claim 26, wherein two of the puncturing tips are located at a first height, and two other of the puncturing tips are located at a second height different from the first height.

29. The aerosol can puncturing system of claim 28, wherein the two puncturing pins having the two puncturing tips located at the first height are diametrically opposed from each other at an 180° spacing interval measured circumferentially around a vertical central axis of the base plate.

30. The aerosol can puncturing system of claim 26, wherein the different height of the at least one puncturing tip is from 0.05 to 0.5 inch different from the height of at least one other of the puncturing tips.

* * * * *